(12) United States Patent
Fischman et al.

(10) Patent No.: US 11,884,543 B2
(45) Date of Patent: Jan. 30, 2024

(54) FLOW THROUGH FUEL REACTOR

(71) Applicant: Massachusetts Institute of Technology, Cambridge, MA (US)

(72) Inventors: Jason Fischman, Stamford, CT (US); Peter Godart, Cambridge, MA (US); Douglas P. Hart, Charlestown, MA (US); EthelMae Victoria Dydek, Waltham, MA (US); Theodore Bloomstein, Medford, MA (US); Andrew Whitehead, Somerville, MA (US); Jean Sack, Eureka, CA (US); Eric Morgan, Bolton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 17/138,159

(22) Filed: Dec. 30, 2020

(65) Prior Publication Data

US 2021/0269306 A1   Sep. 2, 2021

Related U.S. Application Data

(60) Provisional application No. 62/984,113, filed on Mar. 2, 2020.

(51) Int. Cl.
| | | |
|---|---|---|
| *C01B 3/08* | (2006.01) | |
| *B01J 8/08* | (2006.01) | |
| *H01M 8/0606* | (2016.01) | |

(52) U.S. Cl.
CPC .............. *C01B 3/08* (2013.01); *B01J 8/085* (2013.01); *B01J 2208/00761* (2013.01); *H01M 8/0606* (2013.01)

(58) Field of Classification Search
CPC ... C01B 3/08; B01J 8/085; B01J 2208/00761; B01J 19/26; B01J 19/2475; H01M 8/0606; Y02E 60/36; Y02E 60/50
See application file for complete search history.

(56) References Cited

U.S. PATENT DOCUMENTS

| | | | |
|---|---|---|---|
| 8,668,897 B2 | 3/2014 | Rosenband et al. | |
| 9,469,532 B2* | 10/2016 | Fullerton | ................... C01B 5/00 |
| 9,624,103 B1 | 4/2017 | Woodall et al. | |
| 2004/0202903 A1* | 10/2004 | deVos | ...................... C01B 3/501 |
| | | | 429/444 |
| 2009/0020174 A1* | 1/2009 | Fennimore | .............. C01B 3/065 |
| | | | 137/565.15 |
| 2010/0297531 A1* | 11/2010 | Liu | ........................ B01D 61/38 |
| | | | 429/81 |
| 2016/0355918 A1 | 12/2016 | Slocum | |
| 2018/0230007 A1 | 8/2018 | Collins | |
| 2020/0199728 A1 | 6/2020 | Slocum | |

OTHER PUBLICATIONS

International Search Report and Written Opinion dated Oct. 4, 2021, for Application No. PCT/US2020/067432.

(Continued)

*Primary Examiner* — Wayne A Langel
*Assistant Examiner* — Syed T Iqbal
(74) *Attorney, Agent, or Firm* — Wolf, Greenfield & Sacks, P.C.

(57) ABSTRACT

Flow through reactors and related methods for use with slurries including water reactive particles are generally described.

27 Claims, 8 Drawing Sheets

(56) References Cited

OTHER PUBLICATIONS

International Preliminary Report on Patentability dated Sep. 15, 2022, for Application No. PCT/US2020/067432).
[No Author Listed], Aluminum as a fuel. Tech Notes. Lincoln Laboratory. MIT. Mar. 2017. <https://archive.ll.mit.edu/publications/technotes/Aluminum-as_fuel.html>. 2 pages.
Fischman et al., Hydrogen generation via the reaction of an activated aluminum slurry with water. Int J Hydrogen Ener. Jul. 10, 2020; 45 (35): 17118-30.

* cited by examiner

FLOW THROUGH FUEL REACTOR

RELATED APPLICATIONS

This application claims priority under 35 U.S.C. § 119(e) to U.S. Provisional Application No. 62/984,113, filed Mar. 2, 2020, and entitled "Hydrogen Generation Via the Reaction Between an Activated Aluminum Slurry and Water," which is incorporated herein by reference in its entirety for all purposes.

TECHNICAL FIELD

Reactors and methods related to hydrogen gas production are generally described.

BACKGROUND

Hydrogen gas has been well recognized as an emission-free fuel holding promise for a more sustainable energy economy compared to fossil fuels. Oxidation-reduction reactions involving metals can produce hydrogen on-demand, eliminating the cost and safety concerns of storing hydrogen as a gas or liquid at high-pressure. Aluminum (Al), for example, has an energy density about two times greater than diesel fuel and forty times greater than lithium ion, and reacts with water to produce hydrogen at room temperature and atmospheric pressure. Using solid metals as a bulk fuel source, however, presents challenges for embedded power systems in applications where volume is constrained.

SUMMARY

Reactors and methods related to hydrogen gas production are generally described. The subject matter of the present disclosure involves, in some cases, interrelated products, alternative solutions to a particular problem, and/or a plurality of different uses of one or more systems and/or articles.

In one embodiment, a flow reactor includes: a first reservoir configured to contain water; a second reservoir configured to contain a slurry including water reactive particles dispersed within the slurry; and a flow through reaction chamber in fluid communication with the first reservoir and the second reservoir. The water from the first reservoir and the slurry from the second reservoir flow through the flow through reaction chamber, where the water and the water reactive particles react to produce hydrogen gas.

In another embodiment, a flow reactor includes: a first reservoir configured to contain water; a second reservoir configured to contain a slurry including water reactive particles dispersed within the carrier fluid; and a porous conduit in fluid communication with the first reservoir and the second reservoir. The water from the first reservoir and the slurry from the second reservoir flow through the porous conduit, and the porous conduit is substantially permeable to gas and is substantially impermeable to the water and the slurry.

In another embodiment, a method includes: flowing water from a first reservoir to a flow through reaction chamber; flowing a slurry from a second reservoir to the flow through reaction chamber, where the slurry includes water reactive particles dispersed within the slurry; flowing hydrogen gas from the flow through reaction chamber to a gas outlet in fluid communication with a downstream portion of the flow through reaction chamber, where the hydrogen gas is produced by a reaction between the water and the water reactive particles; and optionally flowing one or more waste products from the reaction chamber to a waste outlet in fluid communication with the downstream portion of the flow through reaction chamber.

In another embodiment, a flow reactor includes: a porous conduit that is substantially permeable to gas and is substantially impermeable to water and a slurry including water reactive particles dispersed within the slurry.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1:
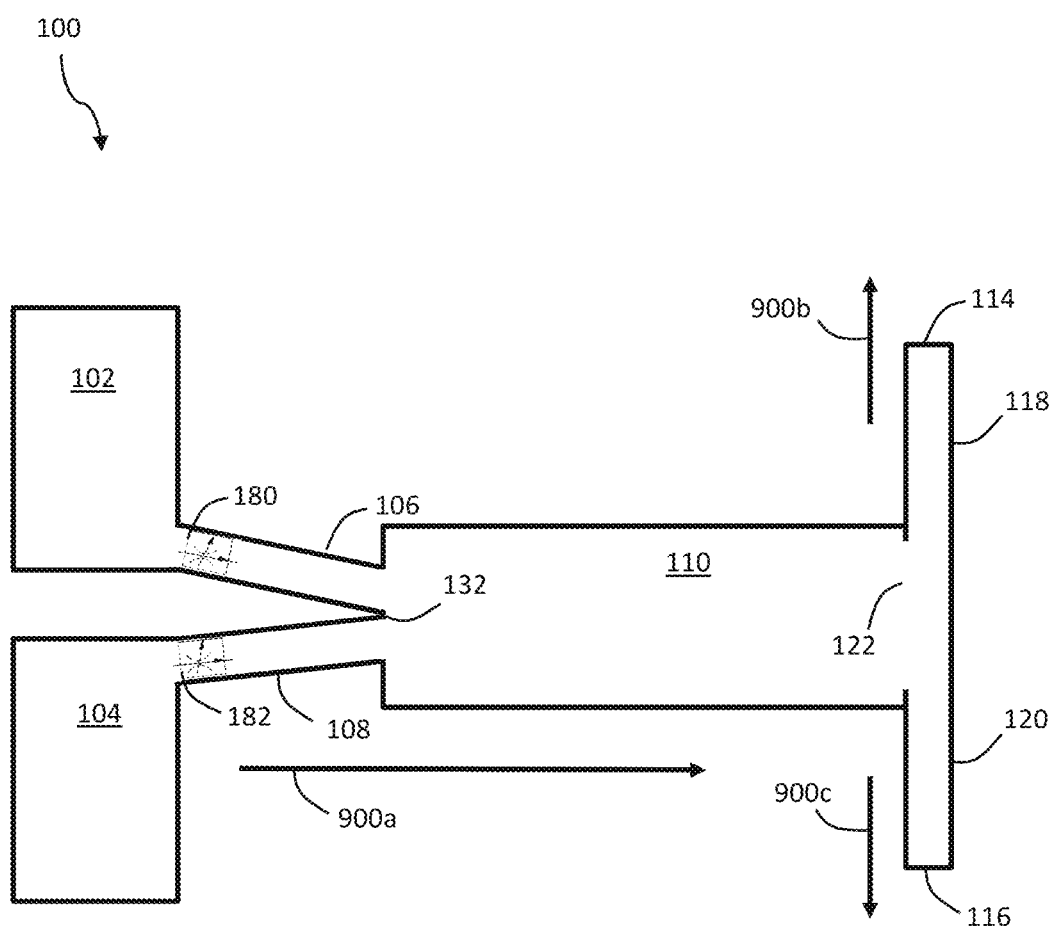
FIG. 1 shows, according to certain embodiments, a schematic diagram of a flow reactor.

The Inventors have realized and appreciated that liquid fuel sources offer a number of distinct advantages as compared to solid bulk fuels. For example, liquid fuel sources (e.g., slurries) can be pumped from their reservoirs, therefore enabling greater packing density and flexibility in the layout of the flow reactor and/or an accompanying power generation system. In addition, liquid fuel sources enable improved control over reaction rates, as compared to solid bulk fuels, because the flow rate of the fuel source and/or the oxidizing source can be modulated. Recognizing the utility of liquid fuel sources, the Inventors sought a mechanism to continuously oxidize liquid fuel sources, therefore moving away from bulky and pressurized batch reactor systems.

A flow reactor that may be used, in certain embodiments, for hydrogen production, is generally described. The Inventors have realized and appreciated that a flow through reactor may be used for the tandem purpose of producing hydrogen gas in a continuous manner and separating the produced hydrogen gas from the reactive starting materials and/or by-products as it is produced. The hydrogen gas is produced within a flow through reaction chamber by reacting water with a slurry stream comprising water reactive particles as they flow through a continuous reaction chamber. The resulting hydrogen gas may then be separated using either a semi-permeable membrane that is permeable to the gas and substantially impermeable to the slurry and resulting waste stream and/or a gravity-based separation strategy where the waste stream is moved vertically downwards from an outlet of the continuous reaction chamber while the gas is permitted to flow vertically upwards due to buoyancy from the outlet.

In certain embodiments, and as explained in greater detail herein, the water reactive particles may comprise aluminum or an alloy thereof. Without wishing to be bound by theory, water and aluminum react to produce hydrogen gas according to either of the following exothermic reactions shown in reactions (1) and (2):

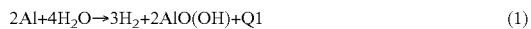

$$2Al + 4H_2O \rightarrow 3H_2 + 2AlO(OH) + Q1 \quad (1)$$

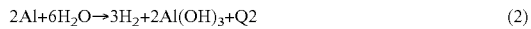

$$2Al + 6H_2O \rightarrow 3H_2 + 2Al(OH)_3 + Q2 \quad (2)$$

where Q1 and/or Q2 is between 840 kJ to 880 kJ of heat, depending on the extent of the reaction.

The Inventors have realized that in some embodiments, a flow reactor may utilize a pressure gradient to flow the water and the slurry comprising water reactive particles into a flow through reaction chamber, resembling a plug flow reactor. As hydrogen gas is produced from the reaction between water and the water reactive particles within the slurry, the hydrogen gas is separated, in some embodiments, by permeating through a membrane that is impermeable to the slurry including the carrier fluid and water reactive particles; the water; the reaction by-products; and/or any other appropriate combinations of the forgoing. In certain other embodiments, the hydrogen gas is separated from the reaction by-products as the stream of material flows out of an outlet of the continuous reaction chamber via a gravity-induced separation. Advantageously, configuring the flow reactor to separate hydrogen gas by permeation or a gravity-induced separation allows the hydrogen gas to be easily utilized as a fuel source, stored, or otherwise used as it is being produced.

As the hydrogen gas is produced and efficiently separated, the hydrogen gas may enter a gaseous conditioning system and/or power generation system that can be used to produce electricity and/or mechanical work (e.g., via a fuel cell, turbine, and/or internal combustion engine). The Inventors have also realized that the power generated from the hydrogen gas may be used to power the flow through reactor and/or a device or system the flow through reactor is associated with. For example, in some embodiments, the flow reactor may be fabricated using flexible materials such that the flow reactor may be used in devices where available volume for an onboard reaction chamber may be constrained, such as autonomous vehicle applications.

As mentioned above, hydrogen gas is produced by exposing water reactive particles to water. In some such embodiments, the rate and amount of hydrogen gas produced can be controlled by modifying the type and concentration of certain water reactive particles. In some embodiments, the water reactive particles comprise aluminum, as described above in relation to reactions (1) and (2). However, other metals may also be used depending on the particular embodiment. Non-limiting examples of water reactive particles that may be used are aluminum, lithium, sodium, magnesium, zinc, boron, beryllium, alloys thereof, and/or mixtures thereof.

The water reactive particles, in some embodiments, comprise an activating composition that is permeated into the grain boundaries and/or subgrain boundaries of the reactant (e.g. aluminum) to facilitate its reaction with water. For example, a reactant may include aluminum combined with gallium and/or indium. In some instances, the activating composition may be an eutectic, or close to eutectic composition, including for example an eutectic composition of gallium and indium. In one such embodiment, the activating composition may comprise gallium and indium where the portion of the activating composition may have a composition of about 70 wt. % to 80 wt. % gallium and 20 wt. % to 30 wt % indium, though other weight percentages are also possible.

Without wishing to be bound by theory, gallium and/or indium may permeate through one or more grain boundaries and/or subgrain boundaries of the reactant (e.g., aluminum).

In certain embodiments, the activating composition may be incorporated into an alloy with the reactant. A metal alloy may comprise any activating composition in any of a variety of suitable amounts. In some embodiments, for example, the metal alloy comprises greater than or equal to 0.1 wt. % of the activating composition, greater than or equal to 1 wt. %, greater than or equal to 5 wt. %, greater than or equal to 15 wt. %, greater than or equal to 30 wt. %, or greater than or equal to 45 wt. % of the activating composition based on the total weight of the metal alloy. In certain embodiments, the metal alloy comprises less than or equal to 50 wt. %, less than or equal to 40 wt. %, less than or equal to 30 wt. %, less than or equal to 20 wt. %, less than or equal to 10 wt. %, less than or equal to 5 wt. %, or less than or equal to 1 wt. % of the activating composition, based on the total weight of the metal alloy. Combinations of the above recited ranges are also possible (e.g., the metal alloy comprises greater than or equal to 0.1 wt. % and less than or equal to 50 wt. % of the activating composition based on the total weight of the metal alloy, the metal alloy comprises greater than or equal to 1 wt. % and less than or equal to 10 wt. % of the activating composition based on the total weight of metal alloy). Other ranges are also possible.

The water reactive particles may be regularly shaped, such as spherical, or may be irregularly shaped chunks. The size of the water reactive particles may be uniform or varied. Alternatively, the water reactive particles may be provided in a more continuous form, such as a powder with any appropriate size distribution for a desired application.

The water reactive particles may have any of a variety of suitable maximum characteristic dimensions (e.g., diameter, length, height, width). In some embodiments, for example, the water reactive particles have an average maximum characteristic dimension less than or equal to 100 micrometers, less than or equal to 90 micrometers, less than or equal to 80 micrometers, less than or equal to 70 micrometers, less than or equal to 60 micrometers, less than or equal to 50 micrometers, less than or equal to 40 micrometers, less than or equal to 30 micrometers, less than or equal to 20 micrometers, or less. In certain embodiments, the water reactive particles have an average maximum characteristic dimension greater than or equal to 10 micrometers, greater than or equal to micrometers, greater than or equal to 30 micrometers, greater than or equal to 40 micrometers, greater than or equal to 50 micrometers, greater than or equal to 60 micrometers, greater than or equal to 70 micrometers, greater than or equal to 80 micrometers, greater than or equal to 90 micrometers, or greater. Combinations of the above recited ranges are also possible (e.g., the water reactive particles have an average maximum characteristic dimension between less than or equal to 100 micrometers and greater than or equal to 10 micrometers, the water reactive particles have an average maximum characteristic dimension between less than or equal to 60 micrometers and greater than or equal to 40 micrometers). Other ranges are also possible.

According to certain embodiments, the water reactive particles of a slurry may be suspended in any appropriate carrier fluid. In some instances this carrier fluid may be a shear thinning fluid, though the disclosure is not limited to only using shear thinning fluids. As used herein, the phrase "shear thinning fluid" is given its ordinary meaning in the art and generally refers to a fluid whose viscosity decreases under shear strain. Any of a variety of suitable shear thinning fluids may be utilized. In some embodiments, for example, the carrier fluid may comprise oil, such as mineral oil, canola oil, and/or olive oil. In certain embodiments, the carrier fluid may comprise a grease, alcohol, or other appropriate material capable of suspending the water reactive particles in the carrier fluid. In certain embodiments, the carrier fluid comprises fumed silica thickening agents, or other appropriate thickening agents.

The slurry may have any of a variety of suitable viscosities. In some embodiments, for example, the slurry has a viscosity greater than or equal to 0.1 Pa·sec, greater than or equal to 0.2 Pa·sec, greater than or equal to 0.3 Pa·sec, greater than or equal to 0.4 Pa·sec, greater than or equal to 0.5 Pa·sec, greater than or equal to 0.6 Pa·sec, greater than or equal to 0.7 Pa·sec, greater than or equal to 0.8 Pa·sec, greater than or equal to 0.9 Pa·sec, or greater. In certain embodiments, the slurry has a viscosity less than or equal 1 Pa·sec, less than or equal to 0.9 Pa·sec, less than or equal to 0.8 Pa·sec, less than or equal to 0.7 Pa·sec, less than or equal to 0.6 Pa·sec, less than or equal to 0.5 Pa·sec, less than or equal to 0.4 Pa·sec, less than or equal to 0.3 Pa·sec, less than or equal to 0.2 Pa·sec, or less. Combinations of the above recited ranges are also possible (e.g., the slurry has a viscosity between greater than or equal to 0.1 Pa·sec and less than or equal to 1 Pa·sec, the slurry has a viscosity between greater than or equal to 0.4 Pa·sec and less than or equal to 0.6 Pa·sec). Other ranges are also possible.

It should be understood that a slurry may have any appropriate ratio of the water reactive particles to carrier fluid by weight. Further, without wishing to be bound by theory, the ratio of the water reactive particles to carrier fluid in the slurry may affect both the physical properties of the slurry as well as the performance of the flow reactor. For example, a slurry that has a ratio of water reactive particles to fluid carrier of 90:10 by weight may be characterized as a paste, whereas a slurry with a ratio of 50:50 may flow more easily. In some applications, a ratio of water reactive particles to fluid carrier as low as 10:90 may be desirable. Accordingly, a ratio of a ratio of water reactive particles to fluid carrier by weight may be between or equal to about 10:90 and 90:10, though other appropriate ranges both greater and less than those noted above are also contemplated. In some embodiments, the slurry may be produced in a colloid mill, although other methods of producing a slurry using any appropriate milling and/or mixing process are also contemplated as the disclosure is not limited in this regard.

In some embodiments, the use of a slurry as a liquid fuel source provides significant advantages, as compared to solid fuel sources (e.g., bulk aluminum metal), including higher packing fraction, ease of storage (e.g., in articles and/or vessels with complex geometries), the ability to pump the liquid fuel source with low losses, and higher shelf stability. In certain embodiments, the slurry may be reacted with water nearly instantaneously due to a higher surface area contact between the water and the water reactive particles dispersed with the carrier fluid, therefore providing higher reaction rates (as compared to the use of solid fuel sources) and controlled hydrogen flow rates. Reactions between the liquid fuel source and water may also be quickly stopped by simply preventing two reactant streams from mixing with one another.

The flow reactor may have any of a variety of suitable shapes and/or sizes. In certain embodiments, for example, the flow reactor may have a maximum characteristic dimension (e.g., a length, a width, a height) greater than or equal to 1 cm, greater than or equal to 2 cm, greater than or equal to 5 cm, greater than or equal to 10 cm, greater than or equal to 20 cm, greater than or equal to 50 cm, greater than or equal to 100 cm, greater than or equal to 200 cm, or greater. In some embodiments, the flow reactor has a maximum characteristic dimension less than or equal to 500 cm, less than or equal to 200 cm, less than or equal to 100 cm, less than or equal to 50 cm, less than or equal to 20 cm, less than or equal to 10 cm, less than or equal to 5 cm, less than or equal to 2 cm, or less. Combinations of the above recited ranges are also possible (e.g., the flow reactor has a maximum characteristic dimension between greater than or equal to 1 cm and less than or equal to 500 cm, the flow reactor has a maximum characteristic dimension between greater than or equal to 5 cm and less than or equal to 20 cm). Other ranges are also possible.

Due to its overall relatively small size and flexibility, the flow reactor described herein may be implemented in a wide variety of applications, including, for example, use in applications requiring electricity and/or mechanical work to operate. For example, in certain non-limiting embodiments, the flow reactor is particularly useful for use in vehicles such as autonomous underwater vehicles, autonomous aerial vehicles, other autonomous vehicles, and/or any other appropriate application including gas and/or power generators as the disclosure is not limited to where or how the disclosed flow through reactors are implemented.

As described above, the flow reactor may comprise a flow through reaction chamber in which the water and the water reactive particles react to produce hydrogen gas. As explained in further detail below, the flow through reaction chamber may comprise a solid flow through reaction chamber and/or one including one or more porous portions that permits gas to permeate out of the flow through reaction chamber into an adjacent volume.

The flow through reaction chamber may be any of a variety of suitable shapes and/or sizes. In certain embodiment, for example, the flow through reaction chamber is substantially cylindrical, although other non-linear shapes corresponding to tubes or conduits with any desired transverse cross-sectional shape and/or that extend along any desired path may be used as the disclosure is not limited to the shape of the flow through reaction chamber. For example, in certain embodiments, at least a portion of the flow through reaction chamber may be substantially spherical, conical, and/or cubical.

In some embodiments, the flow through reaction chamber may have any of a variety of suitable maximum cross-sectional dimensions (e.g., a cross-sectional diameters) corresponding to a solid flow through reaction chamber and/or one or more porous portions of the flow through reaction chamber. In some embodiments, for example, the flow through reaction chamber has a maximum cross-sectional dimension greater than or equal to 0.1 cm, greater than or equal to 0.2 cm, greater than or equal to 0.5 cm, greater than or equal to 1 cm, greater than or equal to 2 cm, greater than or equal to 5 cm, greater than or equal to 10 cm, greater than or equal to 20 cm, or greater. In certain embodiments, the flow through reaction chamber has a maximum cross-sectional dimension less than or equal to 50 cm, less than or equal to 20 cm, less than or equal to 10 cm, less than or equal to 5 cm, less than or equal to 2 cm, less than or equal to 1 cm, less than or equal to 0.5 cm, less than or equal to 0.2 cm, or less. Combinations of the above recited ranges are also possible (e.g., the flow through reaction chamber has a maximum cross-sectional dimension between greater than or equal to 0.1 cm and less than or equal to 50 cm, the flow through reaction chamber has a maximum cross-sectional dimension between greater than or equal to 1 cm and less than or equal to 5 cm). Other ranges are also possible.

In some embodiments, the flow through reaction chamber may have any of a variety of suitable maximum characteristic dimensions (e.g., a length, a width, a height) corresponding to a solid flow through reaction chamber and/or one or more porous portions of the flow through reaction chamber. In certain embodiments, for example, the flow through reaction chamber has a maximum characteristic dimension (e.g., a length, a width) greater than or equal to 1 cm, greater than or equal to 2 cm, greater than or equal to 5 cm, greater than or equal to 10 cm, greater than or equal to 20 cm, greater than or equal to 50 cm, greater than or equal to 100 cm, or greater. In some embodiments, the flow through reaction chamber has a maximum characteristic dimension less than or equal to 200 cm, less than or equal to 100 cm, less than or equal to 50 cm, less than or equal to 20 cm, less than or equal to 10 cm, less than or equal to 5 cm, less than or equal to 2 cm, or less. Combinations of the above recited ranges are also possible (e.g., the flow through reaction chamber has a maximum characteristic dimension between greater than or equal to 1 cm and less than or equal to 200 cm, the flow through reaction chamber has a maximum characteristic dimension between greater than or equal to 5 cm and less than or equal to 20 cm). Other ranges are also possible.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to certain embodiments, a schematic diagram of a flow reactor. In some embodiments, flow reactor 100 comprises first reservoir 102. In certain embodiments, first reservoir 102 is configured to contain water.

Flow reactor 100 comprises second reservoir 104, in certain embodiments. In some embodiments, second reservoir 104 may be configured to contain a slurry. The slurry may include water reactive particles dispersed within a non-reactive carrier fluid.

According to certain embodiments, the first reservoir and/or the second reservoir may comprise a flexible material. Utilizing a flexible material to construct the first reservoir and/or the second reservoir may be advantageous in some embodiments including, for example, implementations in autonomous underwater vehicles (AUVs) and unmanned aerial vehicles (UAVs) where optimizing volume utilization due to their complex internal geometries is desirable. Any of a variety of flexible materials may be utilized.

Referring to FIG. 1, flow reactor 100 comprises flow through reaction chamber 110, in certain embodiments. According to some embodiments, flow through reaction chamber 110 is in fluid communication with a first reservoir 102 configured to contain water and a second reservoir 104 configured to contain a slurry including water reactive particles dispersed therein. As shown in FIG. 1, for example, an inlet of the flow through reaction chamber 110 is in fluid communication with first reservoir 102 via conduit 106 and second reservoir 104 via conduit 108. In certain embodiments, water from first reservoir 102 and the slurry from second reservoir 104 flow through flow through reaction chamber 110 in the direction of arrow 900a.

According to certain embodiments, for example, a method of producing hydrogen gas is described. In some embodiments, the method comprises flowing water from the first reservoir to the flow through reaction chamber. Referring, for example, to FIG. 1, water may flow from first reservoir 102 to flow through reaction chamber 110 via conduit 106. In certain embodiments, the method comprises flowing the slurry from the second reservoir to the flow through reaction chamber. Referring again to FIG. 1, a slurry may flow from second reservoir 104 to flow through reaction chamber 110 via conduit 108.

In certain embodiments, a flow control device such as a pump or valve depending on the particular arrangement is used to control a flow the water and/or the slurry from the first reservoir and the second reservoir, respectively, to the flow through reaction chamber. Referring, to FIG. 1, for example, flow reactor 100 may comprise flow control device 180 and/or flow control device 182. In certain embodiments, the flow control device may be used to establish a pressure gradient to flow the water and/or the slurry from their respective reservoirs to the flow through reaction chamber. In addition, the established pressure gradient may induce the flow of the hydrogen gas and/or the one or more waste products from the flow through reaction chamber to their respective outlets. Any of a variety of methods may be used to establish a pressure gradient. For example, in certain embodiments, the flow control device may comprise one or more pumps capable of providing a pressure gradient. Examples of pumps include peristaltic pumps and/or reverse rotation roller pumps which are particularly useful for flowing the slurry from second reservoir 104 to flow through reaction chamber 110.

The pumps may be configured to deliver a predetermined ratio of water to slurry (e.g., water reactive particles) to the flow through reaction chamber, in some embodiments. For example, in certain embodiments, the molar ratio of water to water reactive particles delivered to the flow through reaction chamber (and the porous conduit) may be greater than 1:1, greater than 2:1, greater than 5:1, greater than 10:1, greater than 20:1, greater than 50:1, greater than 100:1, or greater. In some embodiments, the molar ratio of water to water reactive particles is less than 150:1, less than 100:1, less than 50:1, less than 20:1, less than 10:1, less than 5:1, less than 2:1, or less. Combination of the above recited ranges are also possible (e.g., the molar ratio of water to water reactive particles is between greater than or equal to 1:1 and less than or equal to 150:1, the molar ratio of water to water reactive particles is between greater than or equal to 20:1 and less than or equal to 100:1. It may be advantageous, in certain embodiments, to have a stoichiometric molar excess of water in order to absorb heat generated during the hydrogen gas production reaction.

In certain embodiments related to underwater applications, ambient hydrostatic pressure may be utilized to flow the water and/or the slurry from the first reservoir and/to the second reservoir, respectively, to the flow through reaction chamber 110. One or more valves (e.g., electrochemical valves) may be utilized within flow control device 180 and/or 182 to allow the reactive starting materials to enter the flow through reaction chamber (i.e., when the one or more valves are in the open position) and to stop the reactive starting materials from entering the flow through reaction chamber or to stop the reactive materials form backflowing into the reservoirs (i.e., when the one or more valves are in the closed position). In some embodiments, as the hydrogen gas flows to the gas outlet, the pressure in the flow reactor decreases, therefore allowing more of the water and the slurry to enter the flow through reaction chamber. In addition, the relatively high pressure of the hydrogen gas produced may be used to flow the one or more waste products from the flow through reaction chamber to the waste outlet.

In some embodiments, as the water and the water reactive particles reach mixing point 132, the water and the water reactive particles react within flow through reaction chamber 110 to produce hydrogen gas. Mixing point 132 and/or adjacent portions of the reaction chamber downstream from the mixing point may include baffling, spiral structures, and/or other appropriate mixing structures that may help induce turbulence and mixing of the two streams of material to help ensure uniform mixing of the water and the slurry. Waste products, such as reaction by-products, may also be produced as the water and the water reactive particles react. The waste products may be inert, in some embodiments. For example, in certain non-limiting embodiments in which the water reactive particles comprise aluminum, the corresponding waste products comprise $Al(OH)_3$ and/or $AlO(OH)$, as described above in relation to reactions (1) and (2).

The flow through reaction chamber may comprise any of a variety of materials. As shown in FIG. 1, the flow reactor comprises gas outlet 114, in certain embodiments. Gas outlet 114 is in fluid communication with a downstream portion of flow through reaction chamber 110 via conduit 118, in some embodiments. In some embodiments, flow reactor 100 comprises waste outlet 116, as shown in FIG. 1, which is in fluid communication with a downstream portion of flow through reaction chamber 110 via conduit 120. According to certain embodiment, flow reactor 100 comprises reaction chamber outlet 122, as shown in FIG. 1, where the reaction chamber outlet 122 is in fluid communication with gas outlet 114 and waste outlet 116 via conduit 118 and conduit 120, respectively.

In some embodiments, gravity-based separation is used to flow hydrogen gas from flow through reaction chamber 110 and reaction chamber outlet 122 to gas outlet 114 and waste from flow through reaction chamber 110 to waste outlet 116. In certain embodiments, for example, conduit 118 extends from reaction chamber outlet 122 that includes a component that is oriented vertically upwards relative to a direction of gravity. Conduit 120, in some embodiments, extends from reaction chamber outlet 122 that includes a component that is oriented vertically downwards relative to a direction of gravity. In some embodiments, for example, as hydrogen gas is produced in flow through reaction chamber 110 via the reaction between water and the water reactive particles, the waste by-products flow through conduit 120 to waste outlet 116 via the force of gravity. As hydrogen gas is produced by the reaction, it flows through conduit 118 to gas outlet 114 due to buoyancy, in some embodiments.

According to some embodiments, a method described herein comprises flowing hydrogen gas from the flow through reaction chamber to the gas outlet in fluid communication with a downstream portion of the flow through reaction chamber. Referring to FIG. 1, for example, hydrogen gas produced within flow through reaction chamber 110 may flow in direction 900b to gas outlet 114 in fluid communication with a downstream portion of flow through reaction chamber 110 via reaction chamber outlet 122 and conduit 118.

In some embodiments, the method comprises flowing one or more waste products from the reaction chamber to the waste outlet in fluid communication with the downstream portion of the flow through reaction chamber. Referring to FIG. 1, for example, one or more waste products produced within flow through reaction chamber 110 may flow in direction 900c to waste outlet 116 in fluid communication with a downstream portion of flow through reaction chamber 110 via reaction chamber outlet 122 and conduit 120.

Figure 2:
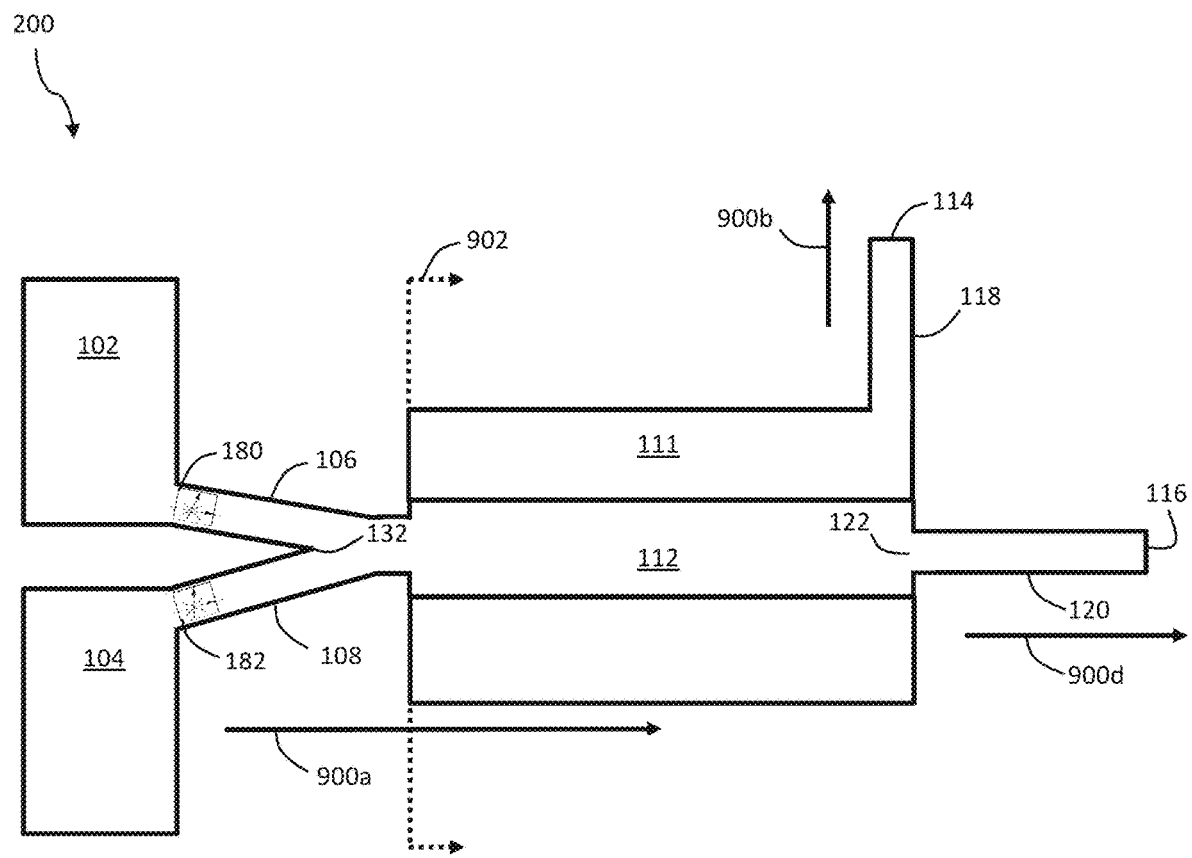
FIG. 2 shows, according to certain embodiments, a schematic diagram of a flow reactor comprising a porous conduit.
Figure 3:
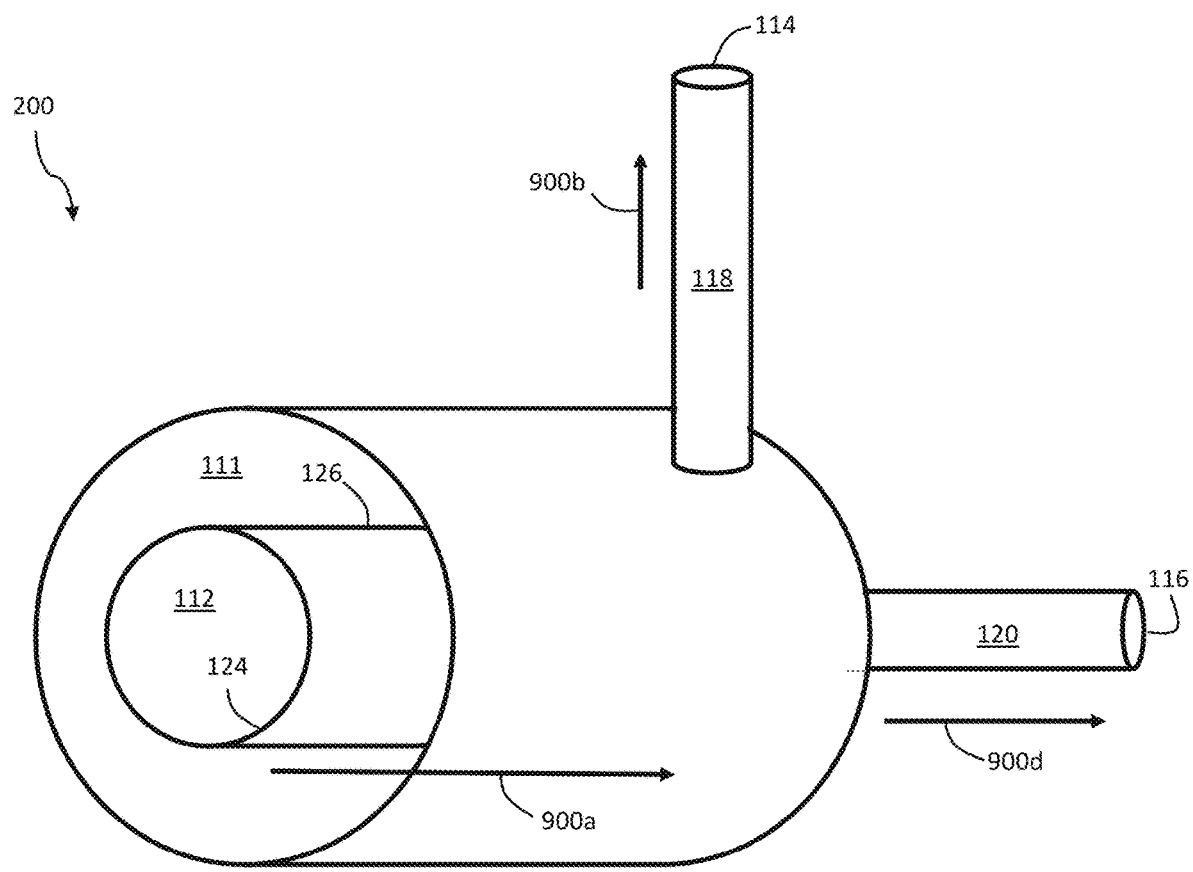
FIG. 3 shows, according to certain embodiments, a schematic cross-sectional diagram of a flow reactor comprising a porous conduit.

According to certain embodiments, the flow through reaction chamber comprises a porous conduit that extends along at least a portion, and in some instances, an entire length of a flow through reaction chamber of a reactor. FIG. 2 shows, according to certain embodiments, a schematic diagram of flow reactor 200 that includes a porous conduit 112 that forms at least a portion of the resulting reaction chamber. In addition, FIG. 3 shows, according to certain embodiments, a schematic cross-sectional diagram of flow reactor 200 comprising porous conduit 112, wherein the cross-section is taken along line 902 in FIG. 2.

Similar to the embodiments described above in reference to FIG. 1, the flow reactor shown in FIG. 2 includes a flow through reaction chamber (e.g., porous conduit 112) in fluid communication with first reservoir 102 and second reservoir 104 (e.g., via conduit 106 and conduit 108, respectively). According to some embodiments, flow reactor 200, similar to flow reactor 100, may be configured to flow water from first reservoir 102 and the slurry from second reservoir 102 through porous conduit 112 in the direction of arrow 900a, such that the water and the water reactive particles react within porous conduit 112, in some embodiments, to produce hydrogen gas. As explained above in reference to FIG. 1, the water and the slurry may be flowed into the porous conduit using a fluid flow control device.

In certain embodiments, flow reactor 200 comprises gas outlet 114 in fluid communication with at least a portion of porous conduit 112 via outer chamber 111. In some embodiments, flow reactor 200 comprises waste outlet 116 in fluid communication with a downstream portion of porous conduit 112 via conduit 120. According to certain embodiment, flow reactor 200 comprises reaction chamber outlet 122 which is in fluid communication with waste outlet 116 via conduit 120.

In some embodiments, porous conduit 112 is substantially permeable to gas. For example, in some embodiments, as hydrogen gas is produced by the reaction between water and the water reactive particles the hydrogen gas may permeate through porous conduit 112 into outer chamber 111. The hydrogen gas may then flow to gas outlet 114, in some embodiments. In certain embodiments, porous conduit 112 is substantially impermeable to the water, the slurry, and/or any by-products produced by the reaction between water and the water reactive particles. Accordingly, in some embodiments, waste by-products flow to waste outlet 116 in fluid communication with downstream portion of porous conduit 112 via reaction chamber outlet 122 and conduit 120 Advantageously, configuring the flow reactor to comprise the porous conduit allows for the hydrogen gas to be easily separated from the reaction stream and/or any unwanted by-products.

For example, in certain embodiments, the method described herein comprises flowing hydrogen gas (e.g., produced within porous conduit 112 and has permeated through porous conduit 112 into outer chamber 111) in direction 900b to gas outlet 114 in fluid communication with a downstream portion of porous conduit 112 via conduit 120. In addition, the method may comprise flowing one or more waste products produced within porous conduit 112, which is substantially impermeable to said waste products, in direction 900d to waste outlet 116 in fluid communication with downstream portion of porous conduit 112 via reaction chamber outlet 122 and conduit 120.

Porous conduit 112 may comprise any of a variety of suitable materials. In certain embodiments, for example, the porous conduit comprises a polymer and/or a ceramic. In certain non-limiting embodiments, for example, the porous conduit comprises polytetrafluoroethylene (e.g., sintered polytetrafluoroethylene).

According to certain embodiments, porous conduit 112 comprises a plurality of pores. For example, in some embodiments, the porous conduit comprises pores having a maximum characteristic dimension (e.g., diameter, length, width) greater than or equal to 0.1 micrometers, greater than or equal to 0.2 micrometers, greater than or equal to 0.5 micrometers, greater than or equal to 1 micrometer, greater than or equal to 2 micrometers, greater than or equal to 5 micrometers, or greater. In certain embodiments, the porous conduit comprises pores having a maximum characteristic dimension less than or equal to 10 micrometers, less than or equal to 5 micrometers, less than or equal to 2 micrometers, less than or equal to 1 micrometer, less than or equal to 0.5 micrometers, less than or equal to 0.2 micrometers, or less. Combinations of the above recited ranges are also possible (e.g., the porous conduit comprises pores having a maximum characteristic dimension between greater than or equal to 0.1 micrometers and less than or equal to 10 micrometers, the porous conduit comprises pores having a maximum characteristic dimension between greater than or equal to 0.5 micrometers and less than or equal to 2 micrometers). Other ranges are also possible.

As best seen in FIG. 3, in some embodiments, at least a portion of interior surface 124 of porous conduit 112 comprises a hydrophobic coating. The hydrophobic coating may advantageously facilitate the flow of the slurry through porous conduit 112 in the direction of 900a without inhibiting the permeation of the hydrogen gas out of porous conduit 112 into flow through reaction chamber 110.

Figure 4:
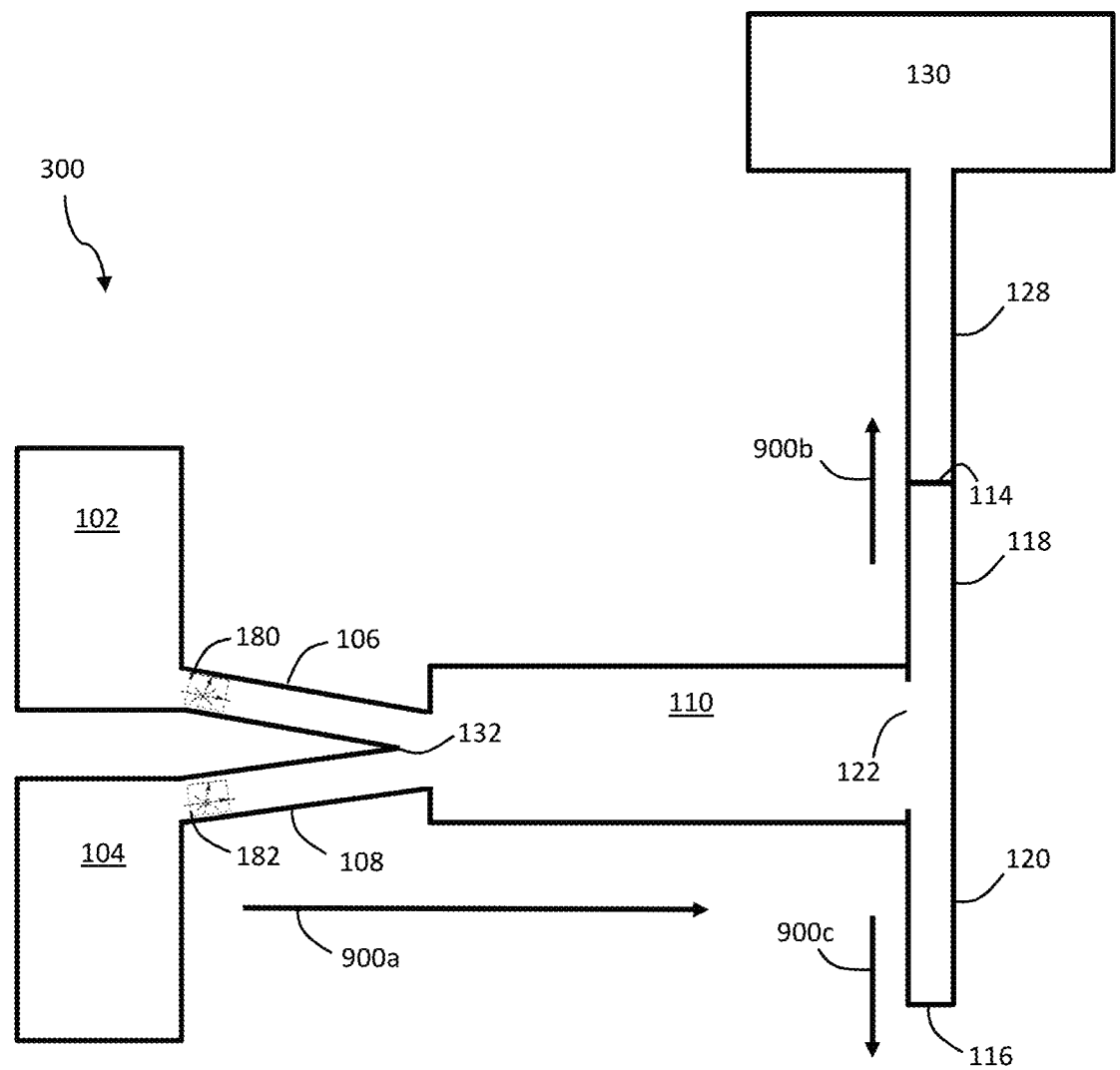
FIG. 4 shows, according to certain embodiments, a schematic diagram of a flow reactor comprising a gaseous conditioning system.

According to some embodiments, a fluid surrounds at least a portion of exterior surface 126 of porous conduit 112. In some embodiments, for example, outer chamber 111 may comprise a fluid that surrounds at least a portion of porous conduit 112. In some such embodiments, the hydrogen gas that is produced may permeate through porous conduit 112 into the fluid at least partially surrounding porous conduit 112. Advantageously, the use of a fluid surrounding porous conduit 112 prevents hydrogen back-flow into porous conduit 112. In certain embodiments, the fluid comprises water. FIG. 4 shows, according to certain embodiments, a schematic diagram of a flow reactor comprising a gaseous conditioning system. In certain embodiments, gas outlet 114 is in fluid communication with gaseous conditioning system and/or power generation system 130 (e.g., via conduit 128).

Gaseous conditioning system and/or power generation system 130 may comprise one or more fuel cells and/or an internal combustion engine, in some embodiments, configured to generate electricity and/or produce mechanical work. The electricity and/or mechanical work produced from the gaseous conditioning system may be used to power the flow reactor and/or a device or system the flow reactor is associated with (e.g., an autonomous vehicle).

According to some embodiments, the method described herein comprises flowing the hydrogen gas from the gas outlet to a gaseous conditioning system. Referring, for example, to FIG. 4, hydrogen gas exiting gas outlet 114 may be flowed in direction 900b to gaseous conditioning system 130 via conduit 128.

Figure 8:
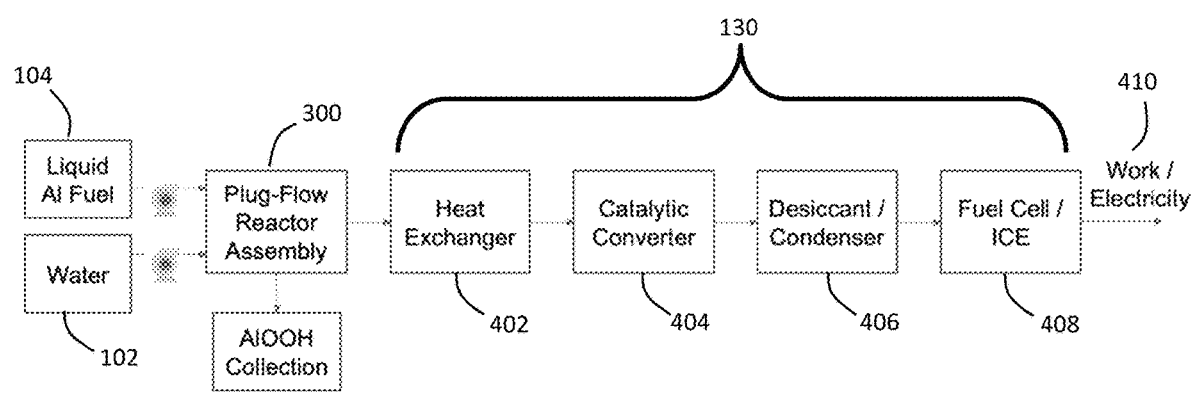
FIG. 8 shows, according to certain embodiments, a schematic diagram of a gaseous conditioning system and/or power generation system.

In some embodiments, the gaseous conditioning system and/or power generation system may comprise a heat exchanger, a catalytic converter, and/or a desiccant and/or condenser. FIG. 8, for example, shows a schematic diagram of a gaseous conditioning system and/or power generation system, according to certain embodiments. As shown in FIG. 8, gaseous conditioning system and/or power generation system may comprise at least one heat exchanger 402, catalytic convertor 404, desiccant/condenser 406, and/or one or more fuel cells and/or internal combustion engine 408. In certain embodiments, heat exchanger 402 may in fluid communication with gas outlet 114 via conduit 128 (see FIG. 4). As would be understood by a person of ordinary skill in the art, heat exchanger 402 may be used, in some embodiments, to reduce the temperature of the hydrogen stream to be compatible with one or more fuel cells by transferring heat from the hydrogen stream to a supplemental stream. In some embodiments, catalytic convertor 404 may be in fluid communication with heat exchanger 402, and desiccant and/or condenser 406 may be in fluid communication with catalytic convertor 404. In certain embodiments, catalytic convertor 404 and/or desiccant and/or condenser 406 may be used to remove any unwanted by-products, contaminants, and/or unreacted starting materials accompanying the hydrogen gas. For example, catalytic convertor 404 and/or desiccant and/or condenser 406 may be used to remove oxygen and/or water (e.g., steam) from the hydrogen gas stream.

After the hydrogen gas stream passes through heat exchanger 402, catalytic convertor 404, and/or desiccant and/or condenser 406, the hydrogen gas flows to one or more fuel cells and/or internal combustion engines 408 in fluid communication with desiccant and/or condenser 406. As would be understood by a person of ordinary skill in the art, the one or more fuel cells and/or internal combustion engine may utilize the hydrogen gas to produce electricity and/or mechanical work 410, in some embodiments.

The following examples are intended to illustrate certain embodiments of the present disclosure, but do not exemplify the full scope of the disclosure.

Example 1

Figure 5:
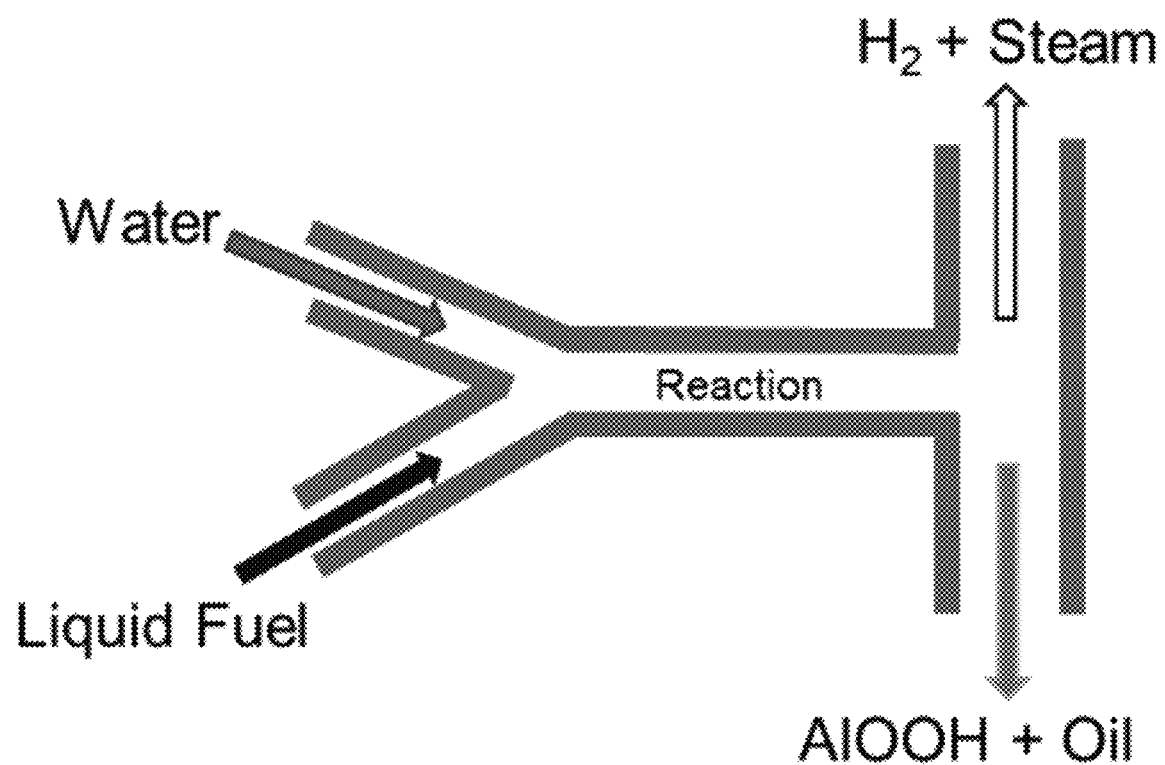
FIG. 5 shows, according to certain embodiments, a schematic diagram of a continuous flow reactor using gravity-driven separation.

The following example describes a gravity-driven flow reactor used to produce hydrogen gas. As shown in FIG. 5, a concept based on a standard gravity-driven water trap mechanism uses gravity to separate the waste products from the gaseous hydrogen evolved. The slurry fuel and oxidizing water are pumped into a tube with the outlet oriented horizontally such that the heated hydrogen and steam reaction products rise due to their densities being lower than ambient air. The remaining AlOOH product and oil from the fuel subsequently fall into a containment vessel for later disposal. The gravity-driven flow reactor was fabricated and is minimally complex and highly effective, but orientation dependent.

Example 2

Figure 6:
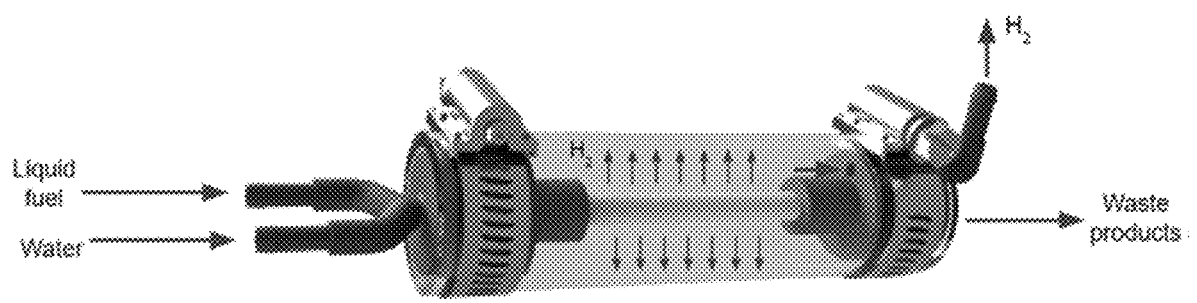
FIG. 6 shows, according to certain embodiments, an image of a flow reactor comprising a porous tube.

The following example described a continuous flow reactor used to produce hydrogen gas. A prototype of the continuous flow reactor is shown in FIG. 6. The water and slurry fuel were pumped into a single tube, but rather than the tube being solid, it was made to be porous, therefore allowing the hydrogen to pass through the tube walls into the remaining power generation components while the waste products continue on through the tube and collect in a waste receptacle. The porous tube was placed inside a larger concentric sealed tube filled with water for visualization purposes and to help prevent hydrogen back-flow.

Figure 7:
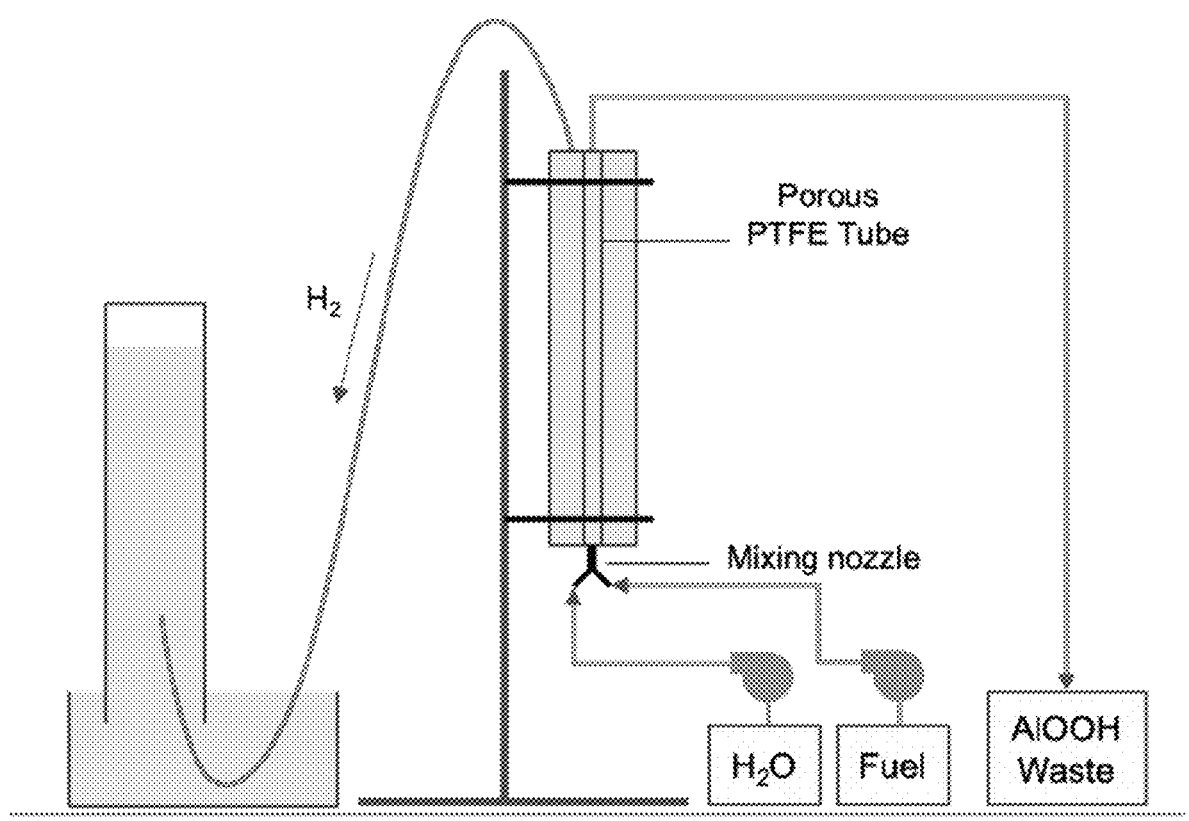
FIG. 7 shows, according to certain embodiments, a schematic diagram of a test setup for flow reactor experiments.

For the porous tube, an ultra-high-molecular-weight (UHMW) polyethylene tube with 10 micrometer pores from Scientific Commodities, Inc. was integrated into the flow reactor. The reactor was then mounted to a test stand, and water and aluminum slurry fuel reservoirs were attached to a "Y"-shaped mixing nozzle at the inlet of the reactor via two low-flow-rate peristaltic pumps, as depicted in FIG. 7. A tube from the hydrogen outlet port of the reactor runs into an inverted graduated cylinder so that the hydrogen evolution could be measured via water displacement in the cylinder. While hydrogen could be stably generated, additional backpressure was required to prevent the hydrogen from leaking out of the waste stream exit. This was achieved by periodically pinching the waste tube closed. In practice, this could be automated by adding a solenoid valve on the waste exit line or even a simple pressure regulator. Additionally, it was found that the oil used in the slurry eventually clogged the pores of the PTFE tube, which could be mitigated through the utilization of an oleophobic coating on the inner surface of the porous tube. Alternatively, solid hydrogen permeable membranes can be used for the construction of this inner tube to allow only hydrogen to pass through to the downstream power system.

The permeability rate of current marketed porous tubes may limit the achievable hydrogen flow rate. The permeability of an example system was calculated using a porous tube with a 0.64 cm inner diameter, 0.15 cm thickness, and 50 cm length as the reaction chamber. The pressure drop to the outside of the porous tube was 5 psi and the desired $H_2$ flow rate was 5 slpm. A hydrogen permeability rate of $5 \times 10^7$ Barrer was calculated for the porous tube via Equation (1):

$$1 \text{ barrer} = 3.35 \cdot 10^{-16} \frac{\text{mol} \cdot \text{m}}{\text{m}^2 \cdot \text{s} \cdot \text{Pa}} \quad (1)$$

The hydrogen permeability rate is significantly higher than the rate for any materials currently found on the market.

Tubes with pores in the range of 10-100 micrometers are easily manufactured and can be used to allow hydrogen to flow out of the reaction chamber while maintaining the liquid and solid waste inside. The pore size does not limit the achievable hydrogen flow, as first order calculations show that with 10 micrometer pores even small pressures should allow for large volumetric flows of hydrogen out of the porous tube. One concern however, is the clogging of the pores with water, oil, or other waste products. As the hydrogen flows outward, there is little to keep the water and oil from flowing outward as well, obstructing the individual pores. However, pore size variation and the use of hydrophobic and/or hydrophilic coatings on the porous tube, may minimize the extent of clogging.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A flow reactor comprising:
a first reservoir;
water disposed in the first reservoir;
a second reservoir;
a slurry including water reactive particles dispersed within a carrier fluid, wherein the slurry is disposed in the second reservoir; and
a flow through reaction chamber in fluid communication with the first reservoir and the second reservoir, wherein the water from the first reservoir and the slurry from the second reservoir flow through the flow through reaction chamber, and wherein the water and the water reactive particles react to produce hydrogen gas.

2. The flow reactor of claim 1, further comprising:
a gas outlet in fluid communication with a downstream portion of the flow through reaction chamber; and/or
a waste outlet in fluid communication with the downstream portion of the flow through reaction chamber.

3. The flow reactor of claim 1, wherein the flow through reaction chamber comprises a porous conduit in fluid communication with the first reservoir and the second reservoir, wherein the water from the first reservoir and the slurry from the second reservoir flow through the porous conduit, wherein the porous conduit is substantially permeable to gas and is substantially impermeable to the water and the slurry.

4. The flow reactor of claim 2, further comprising a reaction chamber outlet in fluid communication with the gas outlet and the waste outlet, and wherein gravity based separation is used to flow hydrogen gas from the reaction chamber to the gas outlet and waste from the reaction chamber to the waste outlet.

5. The flow reactor of claim 4, further comprising:
a first conduit in fluid communication with the reaction chamber outlet and the gas outlet, and wherein the first conduit extends from the reaction chamber outlet in a first direction that includes a component that is oriented vertically upwards relative to a direction of gravity; and
a second conduit in fluid communication with the reaction chamber outlet and the waste outlet, and wherein the second conduit extends from the reaction chamber outlet in a second direction that includes a component that is oriented vertically downwards relative to a direction of gravity.

6. The flow reactor of claim 1, wherein the water reactive particles comprise aluminum.

7. The flow reactor of claim 1, wherein the water reactive particles comprise an activating composition comprising gallium and/or indium.

8. The flow reactor of claim 1, wherein the slurry has a viscosity between or equal to 0.1 Pa·sec and 1 Pa·sec.

9. The flow reactor of claim 2, wherein the gas outlet is in fluid communication with a gaseous conditioning system.

10. The flow reactor of claim 1, wherein the carrier fluid comprises a shear thinning fluid.

11. The flow reactor of claim 1, wherein the carrier fluid comprises an oil, a grease, and/or an alcohol.

12. A flow reactor comprising:
a first reservoir;
water disposed in the first reservoir;
a second reservoir;
a slurry including water reactive particles dispersed within a carrier fluid, wherein the slurry is disposed in the second reservoir; and
a porous conduit in fluid communication with the first reservoir and the second reservoir, wherein the water from the first reservoir and the slurry from the second reservoir flow through the porous conduit, wherein the porous conduit is permeable to gas and is impermeable to the water and the slurry.

13. The flow reactor of claim 12, wherein the water reactive particles and the water react to produce hydrogen gas.

14. The flow reactor of claim 12, further comprising:
a gas outlet in fluid communication with a downstream portion of the porous conduit; and
a waste outlet in fluid communication with the downstream portion of the porous conduit.

15. The flow reactor of claim 14, wherein the gas outlet is in fluid communication with the downstream portion of the porous conduit via an outer chamber that surrounds the porous conduit.

16. The flow reactor of claim 12, wherein the water reactive particles comprise aluminum.

17. The flow reactor of claim 12, wherein the water reactive particles comprise an activating composition comprising gallium and/or indium.

18. The flow reactor of claim 12, wherein the slurry has a viscosity between or equal to 0.1 Pa·sec and 1 Pa·sec.

19. The flow reactor of claim 12, wherein the porous conduit comprises polytetrafluoroethylene.

20. The flow reactor of claim 12, wherein the porous conduit comprises a ceramic.

21. The flow reactor of claim 12, wherein the porous conduit comprises pores having a maximum characteristic dimension between or equal to 0.1 micrometer and 10 micrometers.

22. The flow reactor of claim 12, wherein at least a portion of an interior surface of the porous conduit comprises a hydrophobic coating.

23. The flow reactor of claim 12, wherein a fluid surrounds at least a portion of an exterior surface of the porous conduit.

24. The flow reactor of claim 23, wherein the fluid comprises water.

25. The flow reactor of claim 14, wherein the gas outlet is in fluid communication with a gaseous conditioning system.

26. The flow reactor of claim 12, wherein the carrier fluid comprises a shear thinning fluid.

27. The flow reactor of claim 12, wherein the carrier fluid comprises an oil, a grease, and/or an alcohol.

* * * * *